3,242,191
THIOL- OR THIONOTHIOLPHOSPHORIC (-PHOS-
PHONIC, -PHOSPHINIC)ACID ESTERS OF CHLO-
ROMETHOXY BENZOTRIAZOLE COMPOUNDS
Hugo Malz, Leverkusen, Klaus Sasse, Cologne-Stamm-
heim, and Günter Unterstenhöfer, Opladen, Germany,
assignors to Farbenfabriken Bayer Aktiengesellschaft,
Leverkusen, Germany, a German corporation
No Drawing. Filed Jan. 23, 1964, Ser. No. 339,607
Claims priority, application Germany, Jan. 26, 1963,
F 38,855
8 Claims. (Cl. 260—308)

The present invention relates to and has as its objects new and useful, insecticidally and acaricidally active phosphorus containing compounds.

More specifically this invention is concerned with thiol- or thionothiol-phosphoric (-phosphonic, -phosphinic) acid esters of the general structure

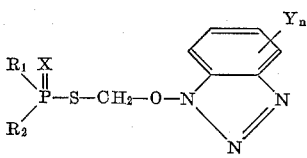

as well as processes for the production of such compounds.

In the above formula, $R_1$ and $R_2$ denote the same or different, optionally halogen-substituted, alkyl, cycloalkyl, aralkyl or alkaryl radicals, or also aryl radicals which may be substituted by halogen atoms, nitro and/or alkoxy groups, with the proviso $R_1$ and $R_2$ may be linked to the phosphorus atom directly or via an oxygen, sulphur or nitrogen atom, whilst X is oxygen or sulphur, Y stands for hydrogen or halogen atoms, furthermore for alkyl, haloalkyl, nitro, alkoxy and/or alkylmercapto groups and $n$ is a whole number from 1 to 4. Compounds according to the invention can be illustrated as follows: $R_1$ and $R_2$ stand for lower alkoxy having up to 4 carbon atoms; $R_1$ can stand for lower alkyl having up to 4 carbon atoms and $R_2$ can stand for lower alkyl having up to 4 carbon atoms or lower alkoxy having up to 4 carbon atoms; and $R_1$ and $R_2$ can stand for ethoxy or methoxy, $n$ is 1 or 0 and Y is chlorine, trifluoromethyl, methyl or methoxy.

In accordance with the present invention it has been found that compounds of the above composition are obtained in a smoothly proceeding reaction and with good yields by reacting thiol- or thionothiolphosphoric (-phosphonic, -phosphinic) acids of the general formula

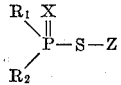

with 1-(halomethoxy)-benztriazoles of the formula

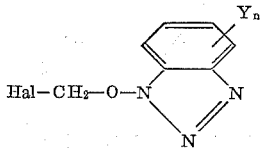

In the last-given formulae, the symbols $R_1$, $R_2$, X, Y and $n$ have the same meaning as indicated above, whilst Z stands for a hydrogen atom, a monovalent metal equivalent, preferably an alkali metal or the ammonium group, and Hal denotes a halogen atom.

The reaction according to the invention is preferably carried out in the presence of inert solvents or diluents. As such agents, aliphatic or aromatic, optionally halogenated hydrocarbons, furthermore alcohols, ketones, ethers or nitriles have proved to be particularly suitable. Furthermore, it is advantageous for achieving good yields and obtaining pure products to allow the process according to the invention to proceed at slightly to moderately elevated temperatures (about 30 to 120° C.) and after the starting components have been combined to heat the reaction mixture further for some time, whilst stirring, in order to complete the reaction.

Furthermore the reaction according to the present process is preferably carried out in the presence of acid-binding agents. Alkali metal carbonates or alcoholates as well as tertiary amines are especially suitable as such agents.

Instead of operating in the presence of the above-mentioned acid-binding agents, it is, however, also possible to prepare first the salts, preferably alkali metal or ammonium salts, of the above-mentioned thiol- or thionothiolphosphoric (-phosphonic, -phosphinic) acids in substance and to react these subsequently according to the present invention.

The 1-(halomethoxy)-benztriazoles required as starting materials for the inventive process have hitherto not been described in the literature. They can, however, be produced by methods known in principle, i.e., by reacting the corresponding 1-hydroxy-benztriazoles with formaldehyde and hydrochloric acid and subsequent halogenation of 1-(hydroxy-methoxy)-benztriazoles obtained as intermediate products with the usual halogenating agents, for example thionyl chloride.

Some of the thiol- or thionothiol-phosphoric (-phosphonic, -phosphinic) acid esters obtainable according to the present invention are colourless to slightly yellow-coloured crystalline substances which can readily be further purified by recrystallisation from the customary solvents. In part, however, the compounds are obtained in the form of oils which cannot be distilled without decomposition.

The inventive products are distinguished by excellent insecticidal properties and are therefore employed as pest control agents, particularly in plant protection.

The new compounds of the present invention very effectively kill insects like aphids, spider mites, caterpillars, beetles, flies, ticks, etc. They distinguish themselves especially by a good contact-insecticidal activity and mostly also by a systemic and ovicidal action. At the same time they have an activity on eating insects such as caterpillars. Most surprisingly they are of remarkable low toxicity against warm-blooded animals. They may be used in the same manner as other known phosphoric insecticides, i.e., in a concentration from about 0.00001% to about 1%, diluted or extended with suitable solid or liquid carriers or diluents. Examples of such solid carriers are talc, chalk, betonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc. As examples for the special utility the inventive compounds of the following formulae

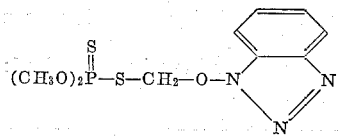

(I)

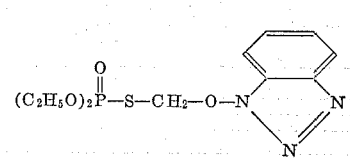

(II)

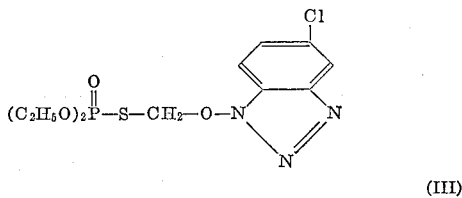

(III)

have been tested against aphids, spider mites and caterpillars.

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
|---|---|---|
| (I) | 0.004 | 100 |
| (II) | 0.004 | 100 |
| (III) | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.004 | 100 |
| (II) | 0.004 | 100 |
| (III) | 0.01 | 100 |

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours.

The following results have been obtained:

| Compound | Aqueous concentration (in percent active ingredient/water) | Killing rate (in percent) |
|---|---|---|
| (I) | 0.004 | 70 |
| (II) | 0.004 | 90 |
| (III) | 0.01 | 100 |

The following examples are given for the purpose of illustrating the invention as claimed:

*Example 1*

(a)

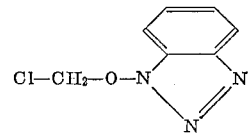

A mixture of 100 g. of 1-hydroxy-benztriazole (benzazimidole), 75 ml. of 30% formaldehyde, 500 ml. of water and 5 ml. of concentrated hydrochloric acid is heated at 100° C. for 1 hour. The reaction mixture is then allowed to cool, the precipitate formed is filtered off with suction, washed with water and the product dried at 60 to 70° C. under reduced pressure. The yield amounts to 104 g. of 1-(hydroxy-methoxy)-benztriazole which melts at about 160° C. with decomposition.

48.5 g. of 1-(hydroxy-methoxy)-benztriazole are suspended in 300 ml. of chloroform. 44 g. of thionyl chloride are added dropwise to this suspension at room temperature, while cooling it with cold water, the mixture is stirred until a clear solution is fomred which is subsequently boiled under reflux for another half hour. The solvent is then distilled off in a vacuum. As residue, there remain about 50 g. of 1-(chloromethoxy)-benztriazole. The melting point of the substance after recrystallising it from dioxan is 171° C. (with decomposition).

(b)

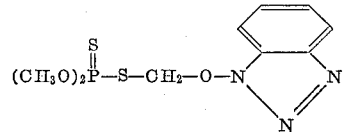

A solution or suspension of 18.4 g. of 1-(chloro-methoxy)-benztriazole and 17.5 g. of the ammonium salt of 0,0-dimethylthionothiol-phosphoric acid in 150 ml. of acetone is heated at boiling temperature for about one hour, whilst stirring. The precipitated ammonium chloride is subsequently filtered off with suction at room temperature and the filtrate evaporated under reduced pressure. There remains a colourless crystalline residue which is recrystallised from methanol. 23 g. of the compound of the above structure are thus obtained in the form of colourless crystals which melt at 83 to 84° C.

*Analysis.*—Calculated for $C_9H_{12}O_3N_3PS_2$: C, 35.4%; H, 3.9%; N, 13.8%; P, 10.2%; S, 21.0%. Found: C, 35.0%; H, 4.1%; N, 14.0%; P,9.9%; S, 20.7%.

Caterpillars are destroyed to 70%, aphids and spider mites even to 100% by 0.004% solutions of the product.

*Example 2*

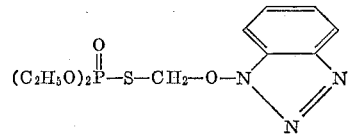

A mixture of 27.6 g. of 1-(chloromethoxy)-benztriazole, 28.5 g. of the ammonium salt of 0,0-diethylthiolphosphoric acid and 200 ml. of acetone is heated at boiling temperature for about 30 minutes. The precipitated ammonium chloride is subsequently filtered off with suction and the filtrate evaporated in a vacuum. After the solid residue has been recrystallised from acetic acid ethyl ester, about 33 g. of the product of the above constitution are obtained in the form of colourless crystals of melting point 74 to 76° C.

0.004% solutions of the compound destroy spider mites and aphids to 100%, caterpillars to 90%.

Example 3

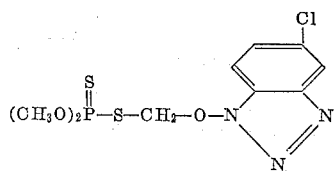

A mixture of 21.8 g. of 1-(chloromethoxy-6-chloro)-benztriazole, 17.5 g. of the ammonium salt of 0,0-dimethylthionothiol-phosphoric acid and 150 ml. of acetone are heated at boiling temperature for about 3 hours. After the precipitated ammonium chloride has been filtered off, the filtrate is evaporated under reduced pressure and the solid residue recrystallised from methanol. The compound of the above structure is obtained in the form of pale grey crystals of melting point 79° C. The yield amounts to about 75% of the theoretical.

Aphids and spider mites are completely destroyed, caterpillars are killed to 60% by 0.01% solutions of the ester.

Example 4

In the same manner as described in Examples 1 to 3, the following compounds can be obtained:

Example 5

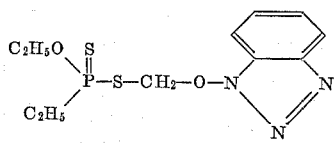

A suspension of 9.5 g. of the ammonium salt of ethyl-O-ethyl-thionothiol-phosphonic acid in 75 ml. of methyl-ethylketone is reacted with 9.2 g. of 1-(chloromethoxy)-benztriazole while stirring. Subsequently the mixture is heated to boiling point for one hour. The precipitated ammonium chloride is subsequently filtered off with suction at room temperature and the filtrate evaporated in a vacuum. The crystalline distillation residue is washed with water and finally dried on a clay plate. There are obtained 10 g. of the compound of the above structure in the form of colourless crystals of M.P. 75 to 77° C.

Example 6

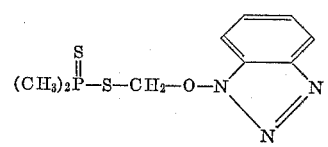

| Constitution | Physical properties | Administration against | Insecticidal activity | |
|---|---|---|---|---|
| | | | Concentration of active ingredient | Killing rate in percent |
| (CH₃O)₂P(=S)—S—CH₂—O—N (benztriazole with CF₃) | M.p: 85° C | Aphids<br>Spider mites | 0.01<br>0.01 | 100<br>90 |
| (CH₃O)₂P(=O)—S—CH₂—O—N (benzoxazole with CH₃) | Brown oil | Aphids<br>Spider mites | 0.01<br>0.01 | 100<br>90 |
| (CH₃O)₂P(=S)—S—CH₂—O—N (benztriazole with OCH₃) | ——do—— | Aphids<br>Spider mites | 0.1<br>0.1 | 100<br>50 |
| (C₂H₅O)₂P(=S)—S—CH₂—O—N (benztriazole with H₃CO) | M.p: 106 to 108° C. | Aphids | 0.001 | 100 |
| (C₂H₅O)₂P(=O)—S—CH₂—O—N (benztriazole with Cl) | Brown oil | Caterpillars<br>Aphids<br>Spider mites | 0.01<br>0.01<br>0.01 | 100<br>100<br>100 |
| (C₂H₅O)₂P(=O)—S—CH₂—O—N (benztriazole with F₃C) | ——do—— | Capterpillars<br>Aphids<br>Spider mites | 0.01<br>0.01<br>0.01 | 40<br>100<br>100 |

8.2 g. of the potassium salt of dimethyl-thionothiolphosphinic acid are suspended with 9.2 g. of 1-(chloromethoxy)-benztriazole in 150 ml. of methylethylketone. Subsequently, this suspension is heated to about 50° C. for half an hour. The precipitate formed is filtered off with suction at room temperature and the filtrate is evaporated in a vacuum. The crystalline distillation residue is recrystallized from methanol. About 13 g. of the product of the above constitution are obtained in the form of colourless crystals of M.P. of 127 to 128° C.

We claim:

1. A compound of the formula

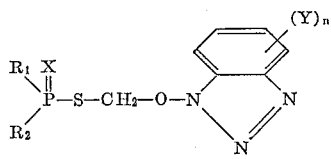

in which $R_1$ and $R_2$ stand for members selected from the group consisting of lower alkyl having up to 4 carbon atoms and lower alkoxy having up to 4 carbon atoms, X stands for a member selected from the group consisting of oxygen and sulphur, Y stands for a member selected from the group consisting of halogen, lower alkyl having up to 4 carbon atoms, halogen substituted lower alkyl having up to 4 carbon atoms and lower alkoxy having up to 4 carbon atoms and in which $n$ stands for a member selected from the group consisting of zero, 1 and 2.

2. A compound according to claim 1 wherein $R_1$ and $R_2$ stand for lower alkoxy having up to 4 carbon atoms.

3. A compounding according to claim 1 wherein $R_1$ stands for lower alkyl having up to 4 carbon atoms and $R_2$ stands for lower alkyl having up to 4 carbon atoms or lower alkoxy having up to 4 carbon atoms.

4. A compound according to claim 1 wherein $R_1$ and $R_2$ stand for ethoxy or methoxy, $n$ is one or zero and Y is chlorine, trifluoromethyl, methyl or methoxy.

5. The compound of the formula

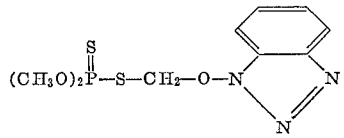

6. The compound of the formula

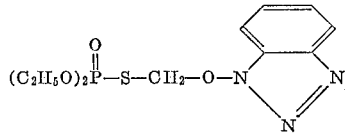

7. The compound of the formula

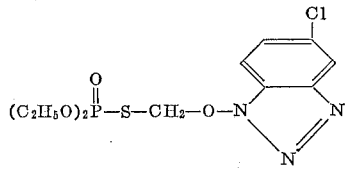

8. The compound of the formula

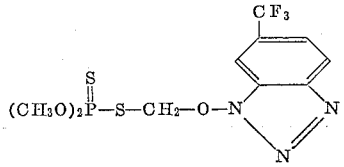

References Cited by the Examiner

UNITED STATES PATENTS 2,902,493    9/1959    Lorenz et al. _____ 260—308.2

FOREIGN PATENTS 1,176,671    4/1959    France.

NICHOLAS S. RIZZO, *Primary Examiner.*